United States Patent
Obata

(10) Patent No.: US 7,406,381 B2
(45) Date of Patent: Jul. 29, 2008

(54) NAVIGATION SYSTEM, VEHICLE NAVIGATION APPARATUS, AND METHOD FOR OBTAINING NAVIGATION INFORMATION

(75) Inventor: Kijuro Obata, Iwaki (JP)

(73) Assignee: Alpine Electronics, Inc., Tokyo (JP)

(*) Notice: Subject to any disclaimer, the term of this patent is extended or adjusted under 35 U.S.C. 154(b) by 614 days.

(21) Appl. No.: 11/084,054

(22) Filed: Mar. 18, 2005

(65) Prior Publication Data
US 2005/0216190 A1    Sep. 29, 2005

(30) Foreign Application Priority Data
Mar. 23, 2004    (JP) .............................. 2004-083897

(51) Int. Cl.
G01C 21/00    (2006.01)
G01C 21/26    (2006.01)
G01C 21/36    (2006.01)

(52) U.S. Cl. .............. 701/211; 340/995.12; 340/995.21
(58) Field of Classification Search ........................ None
See application file for complete search history.

(56) References Cited

U.S. PATENT DOCUMENTS

| | | | |
|---|---|---|---|
| 5,911,775 A | 6/1999 | Tanimoto | |
| 6,334,089 B2 * | 12/2001 | Hessing | 701/209 |
| 6,680,694 B1 * | 1/2004 | Knockeart et al. | 342/357.09 |
| 6,810,329 B2 * | 10/2004 | Koga | 701/211 |
| 2002/0040271 A1 * | 4/2002 | Park et al. | 701/209 |
| 2005/0043884 A1 * | 2/2005 | Atarashi | 701/202 |

* cited by examiner

Primary Examiner—Michael J. Zanelli
(74) Attorney, Agent, or Firm—Brinks Hofer Gilson & Lione

(57) ABSTRACT

A navigation system, a vehicle navigation apparatus therein, and a method for obtaining navigation information using the same are provided which can obtain navigation information quickly when a vehicle goes off-route by obtaining the navigation information required for route guidance of the vehicle through communications, thereby achieving reduction in communication time and cost. In a vehicle-mounted terminal connected in communication with a server for executing route guidance to provide a guidance route from the present position of the vehicle to a destination, when the vehicle reaches a point located at a predetermined distance before a fork representing the next turn on the guidance route, the server is accessed to set a communication means in a communication connection stand-by state. If the vehicle deviates from the guidance route, information needed for the vehicle to return to the guidance route is requested from the server. After the vehicle passes through the fork along the guidance route, the communication connection stand-by state is released.

20 Claims, 7 Drawing Sheets

NAVIGATION SYSTEM, VEHICLE NAVIGATION APPARATUS, AND METHOD FOR OBTAINING NAVIGATION INFORMATION

BACKGROUND OF THE INVENTION

1. Field of the Invention

The present invention relates to navigation systems, and more particularly, to a vehicle navigation apparatus adapted to effectively obtain navigation information in a navigation system which comprises a vehicle-mounted terminal (navigation apparatus) and a server connected in communication with the terminal for guiding a vehicle along a guidance route from a present position of the vehicle to a destination based on a requirement from the terminal, and to a method for obtaining navigation information using the same.

2. Description of the Related Art

Conventional navigation apparatus are provided with a CPU for controlling all procedures associated with navigation, a storage device, such as a CD-ROM or a DVD-ROM, for storing therein map data, a display device, a global positioning system (GPS) receiver for detecting a present position of the vehicle, a gyro and/or vehicle speed sensor for detecting the direction of travel and/or the traveling speed of the vehicle, and a vehicle information and communication system (VICS) receiver for receiving traffic information. With the CPU, map data including information about the present vehicle position is read from the storage device. Based on the map data, a map image covering the vehicle position and its surroundings is displayed on a display screen with a vehicle position mark indicative of the present vehicle position superimposed on the screen. As the vehicle travels, the map image is scrolled with the vehicle position mark fixed on the screen, or otherwise the vehicle position mark is moved on the image with the map image fixed on the screen, thus enabling a user to understand the present traveling position of the vehicle at first glance.

A vehicle navigation apparatus normally has a function of route guidance (route guidance function) that enables a user to easily travel an appropriate route to a desired destination without taking a wrong path. This route guidance function searches for the appropriate route with the CPU from a starting point (which is typically a present position of the vehicle) to the destination using the map data by simulation calculation, such as a lateral search method or a Dijkstra method. The searched route is stored as a guidance route, and then displayed on the map image in a manner distinguished from other roads (e.g. in a different color, or in a different line thickness) during the vehicle's traveling. Alternatively or additionally, when the vehicle is approaching a point located at a predetermined distance before an intersection where a next turn is to be made on the guidance route, a guidance map concerning the intersection (an enlarged view of the intersection, an arrow indicative of a traveling direction at the intersection, a distance to the intersection, a name of the intersection, or the like) is displayed on the map image, so that the user can understand on which road the vehicle should travel, or in which direction the vehicle should progress from the intersection. Such a navigation apparatus capable of performing route search using only the map data installed on the vehicle (i.e., "on board") is called "local navigation".

On the other hand, "communication navigation" proposed as another navigation type has recently attracted increased attention. This navigation type is designed to perform route guidance based on the result of route search obtained from outside of the vehicle by communications (i.e., "off board").

The typical communication navigation system sends positional data concerning the present vehicle position and the destination to a server (information center), which is connected to the vehicle through the Internet or the like, from the user's vehicle through a portable telephone. Based on the positional data, an appropriate guidance route (recommended route) to the vehicle is searched for or retrieved on the server side, and the result of searching is downloaded by communications, thereby carrying out route guidance of the vehicle.

In the case of communication navigation, the amount of data in a database installed on the center side is large, and the contents of the data are generally updated whenever necessary. The latest updated map data (road information, point of interest (POI) information, VICS information, or the like) is consistently kept in the database. Thus, this type of navigation has an advantage that the most accurate guidance information can be provided to the vehicle-mounted terminal (navigation apparatus). On the other hand, such a navigation system has the following disadvantages. On the vehicle-mounted terminal side, information needed for route guidance of the vehicle must be obtained from the center by communications, resulting in high communication costs. Additionally, the route guidance is carried out while downloading the necessary information. This communication requires much time, which leads to poor responsiveness of the navigation.

In such a known communication navigation apparatus, a measure has been developed to decrease the number of possible communications with the center so as to reduce the time and cost required for the communications. As an example, a new type of navigation apparatus has been proposed which is designed to obtain data about routes in starting route guidance, and then to carry out the route guidance after obtaining all route data.

As one approach associated with the above-mentioned "communication navigation", a communication navigation system is disclosed in JP-A-11-339182, for example, which can obtain the most appropriate route information according to the current condition of the vehicle, while achieving cost savings in communications and avoiding new complicated communication techniques.

The conventional "communication navigation" type of navigation apparatus is adapted to minimize the amount of information included in the map data (data about routes, data including a map associated with a surrounding area of the route, or the like) obtained from the center so as to decrease communications traffic. If the vehicle has deviated from the guidance route (that is, in the case of off-route), the apparatus must communicate with the center again to obtain navigation information needed for the vehicle to return to the guidance route (hereinafter referred to as "map data for rerouting").

In this case, however, it is necessary to take some time to access the center so as to establish communications (communication connection time), as well as some additional time to obtain the map data for rerouting from the center based on the access (data obtaining time). As a result, the operation speed of the apparatus becomes low (that is, the responsiveness thereof is reduced), which proves problematic from a practical viewpoint. That is, since the conventional communication navigation apparatus is designed to access the center when the vehicle goes off-route, the map data for rerouting (navigation information) disadvantageously cannot be obtained until the total time of at least the communication connection time and the data obtaining time has passed since the time of going off-route.

To deal with such inconvenience, some communication navigation apparatus are provided for previously obtaining map data with a predetermined map width. For example, the navigation is designed to previously obtain information on roads and POI located within a range of 300 m on each side of the guidance route, or the like. Since this communication navigation apparatus must obtain a relatively large amount of data, the communications traffic, in other words, communication time is increased, which disadvantageously results in high communication costs.

SUMMARY OF THE INVENTION

The present invention has been accomplished in view of those problems encountered with the prior art, and it is an object of the invention to provide a navigation system and a vehicle navigation apparatus therein that can obtain navigation information quickly when a vehicle goes off-route in obtaining the navigation information required for route guidance of the vehicle by communications, thereby achieving reduction in communication time and cost. Furthermore, the invention has another object to provide a method for obtaining navigation information using the same.

The main cause of the vehicle's deviation from an original guidance route (that is, the vehicle going off-route) is that the vehicle does not turn at a point on a road (a fork including an intersection, a junction of three streets, or the like) where the vehicle should turn, or that the vehicle turns at another intersection next to an intersection where the vehicle should turn. In view of this, according to the invention, attention is given to the fork, such as an intersection, on the guidance route which is principally considered as the main cause of the vehicle taking a wrong path during travel on the guidance route, and preparation for communication connection is started as soon as the vehicle reaches a point located at a predetermined distance before the fork, whereby the above-mentioned problems in the prior art are solved.

That is, according to one aspect of the present invention, there is provided a navigation system comprising a vehicle-mounted terminal, and a server connected in communication with the terminal for executing route guidance to provide a guidance route from a present position of the vehicle to a destination based on a requirement from the terminal. In the vehicle-mounted terminal, when the vehicle reaches a point located at a predetermined distance before a fork which represents the next turn on the guidance route provided by the server, the server is accessed by a communication means to set the communication means in a communication connection stand-by state. If the vehicle deviates from the guidance route, navigation information needed for the vehicle to return to the guidance route is requested from the server by the communication means.

In the navigation system with this arrangement, when the vehicle reaches the point located at the predetermined distance before the fork which might cause an off-route situation, preparation for communication connection is started by setting the communication means in the communication connection stand-by state (preparation state in which data communication with the server can be established at any time). Accordingly, if the vehicle does go off-route in the vicinity of the fork, the possibility that the communication connection stand-by state has already been established at the off-route time is very high. In other words, a time required for communication connection is substantially eliminated, as compared with the conventional case in which preparation for the communication connection is started at the off-route time, so that the necessary navigation information can be obtained quickly at the off-route time.

In order to obtain the necessary navigation information in the case of going off-route, the total time of at least the communication connection time and the data obtaining time is required in the prior art, while only the data obtaining time is essential in the present invention. This enables a reduction in the total length of communication time, thus resulting in a reduction in communication costs. For example, in the case of using a pay-as-you-go communication service, such as a packet telecommunication, without carrying out the data communications, it would not cost a user of the system at all (i.e., no communication costs). In such a case, the invention is especially advantageous.

According to another aspect of the invention, there is provided a vehicle navigation apparatus comprising communication means for communicating with a server that delivers various kinds of information associated with navigation, vehicle position detecting means for detecting the present position of a vehicle, memory means for storing therein map data about the navigation obtained from the server through the communication means, and controlling means operably connected to the communication means, the vehicle position detecting means, and the memory means. When the controlling means detects the vehicle reaching a point located at a predetermined distance before a fork which represents the next turn with reference to the present vehicle position and the map data while the vehicle is being guided along a guidance route provided by the server, the controlling means sets the communication means in a communication connection stand-by state. If the controlling means detects the vehicle deviating from the guidance route, it requests navigation information needed for the vehicle to return to the guidance route, from the server through the communication means.

According to a further aspect of the invention, there is provided a method for obtaining navigation information in a vehicle navigation apparatus connected in communication with a server for executing route guidance to provide guidance from the present position of a vehicle to a destination based on a requirement from the vehicle. The method comprises the steps of, when the vehicle reaches a point located at a predetermined distance before a fork which represents the next turn on the guidance route while the vehicle is guided along the guidance route provided by the server, accessing the server through a communication means to set the communication means in a communication connection stand-by state, and if the vehicle deviates from the guidance route, requesting navigation information needed for the vehicle to return to the guidance route from the server through the communication means.

DESCRIPTION OF THE PREFERRED EMBODIMENTS

Some preferred embodiments of the invention will be explained hereinafter with reference to the accompanying drawings.

Figure 1:
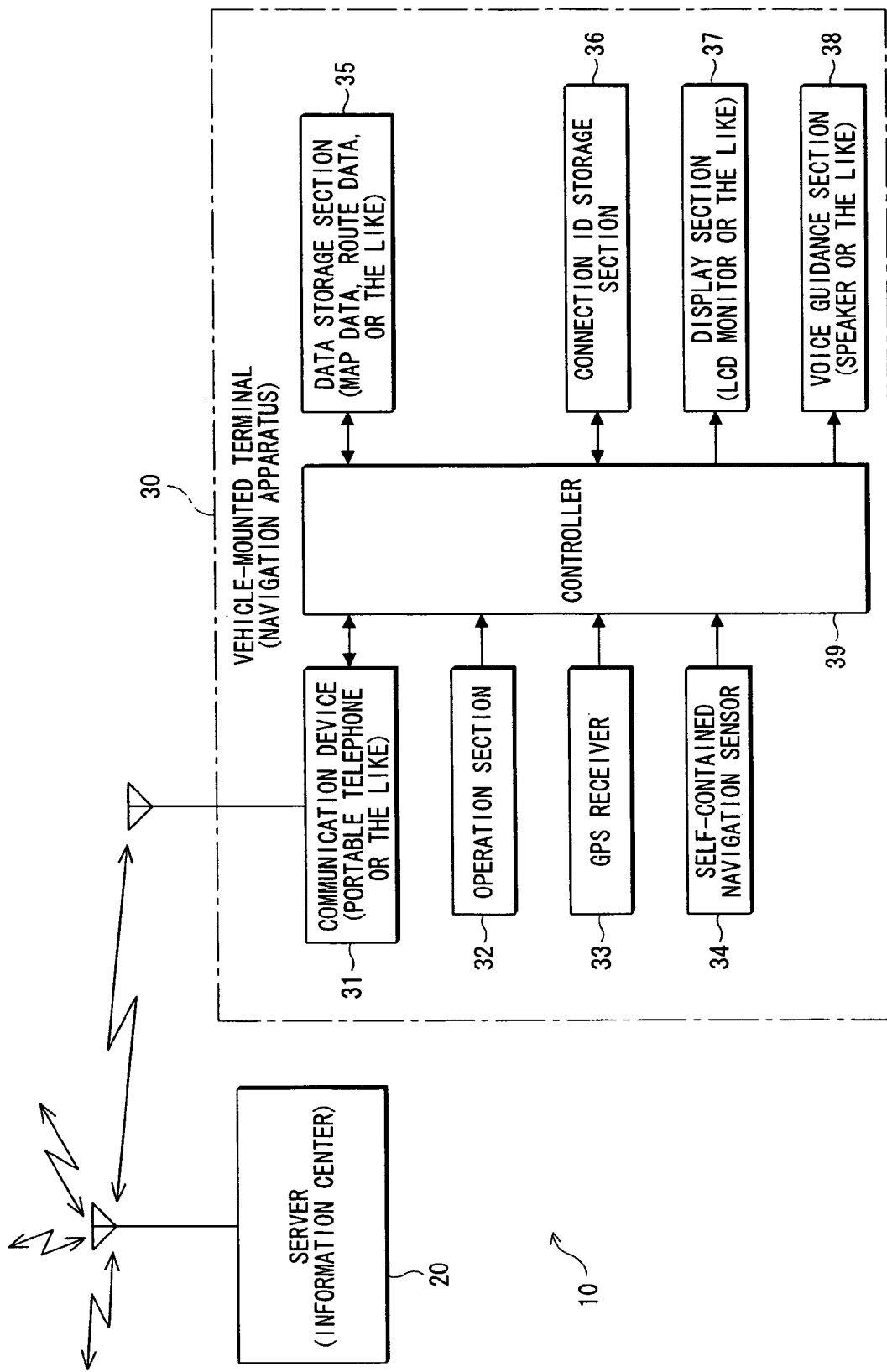
FIG. 1 is a schematic block diagram showing the configuration of a vehicle-mounted terminal (navigation apparatus) in a navigation system according to one preferred embodiment of the invention.
Figure 2:
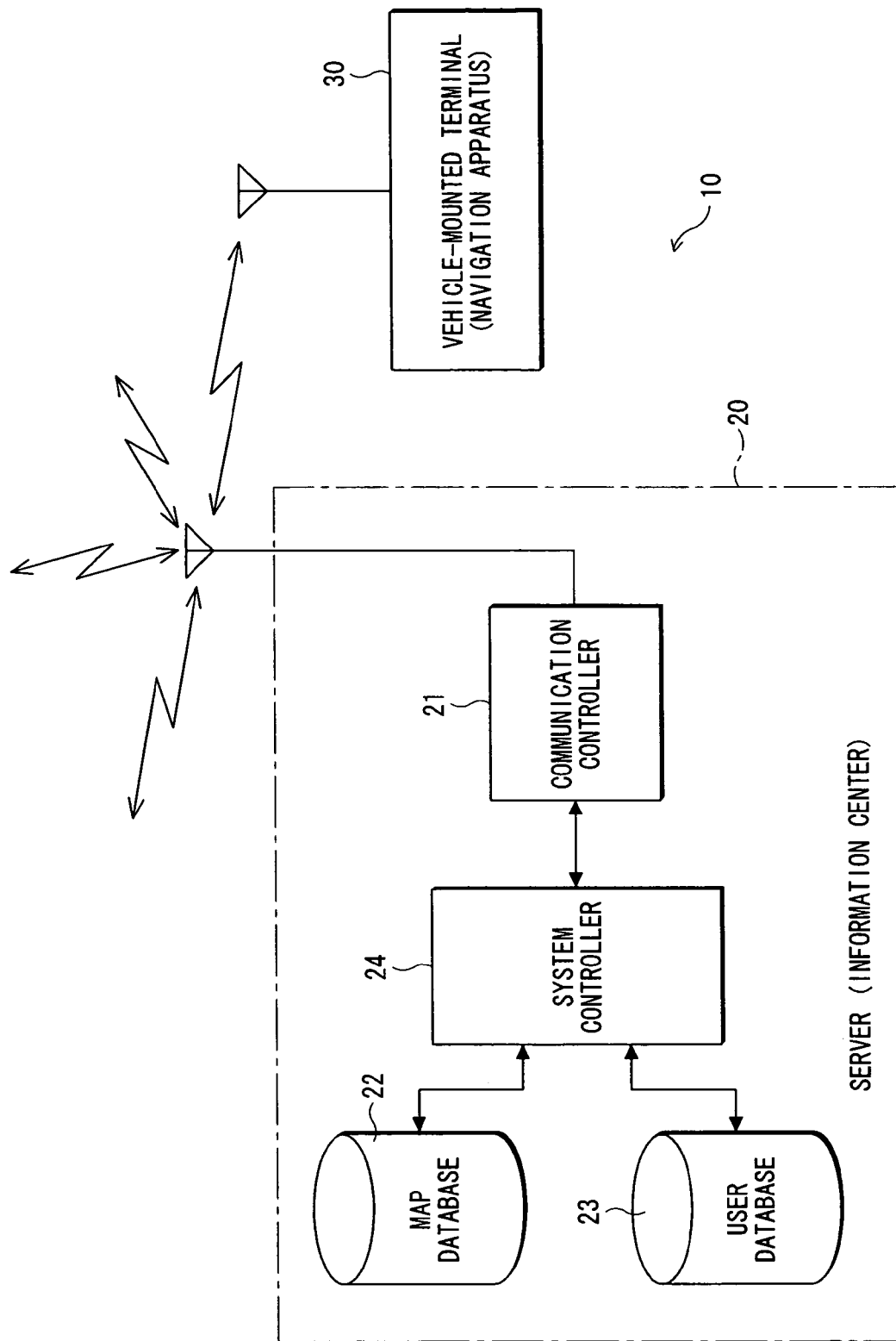
FIG. 2 is a schematic block diagram showing the configuration of a server (information center) communicatively connected to the vehicle-mounted terminal (navigation apparatus) of FIG. 1.

FIG. 1 schematically shows the configuration of a vehicle-mounted terminal (navigation apparatus) in a navigation system according to one preferred embodiment of the invention. FIG. 2 schematically shows the configuration of a server (information server) connected in communication with the vehicle-mounted terminal.

A navigation system 10 according to the present embodiment comprises a server (information center) 20 for offering a delivery service of various kinds of information (road information, POI information, information on route guidance, VICS information, or the like) associated with navigation, and a vehicle-mounted terminal (navigation apparatus) 30 connected in communication with the server 20 through the Internet or the like. The present embodiment is intended to employ "communication navigation", in which an appropriate guidance route (recommended route) connecting the present position of the vehicle and a destination is searched for by the information center 20 based on a requirement from the vehicle-mounted terminal 30, and the result of route search is downloaded to the terminal by communications so as to guide the vehicle along the guidance route.

First, referring to FIG. 2, the server (information center) 20 includes a communication controller (including an antenna) 21 for controlling transmission and reception of data to and from the vehicle-mounted terminal (navigation apparatus) 30, a large-capacity map database 22, a user database 23, and a system controller 24 for controlling inputs and outputs among the communication controller 21 and the databases 22 and 23. The map database 22 stores therein the latest map data divided into pieces, each having appropriate longitudinal and latitudinal widths, depending on a scale level, such as $1/12,500$, $1/25,000$, or $1/50,000$. The map data includes road data for display, road data for route search, data on positions of various facilities (data on POI), such as a convenience store, a supermarket, a discount shop, a family restaurant, or a gas station. Each position is represented by a set of coordinates of a point (node) expressed in latitude and longitude. The user database 23 stores therein information about route history (route data) related to ID information of the vehicle for each user of the corresponding vehicle-mounted terminal 30, as described later.

Now, referring back to FIG. 1, the vehicle-mounted terminal (navigation apparatus) 30 includes a communication device (portable telephone in the present embodiment) 31 for transmitting and receiving the data to and from the outside (information center 20 in this case) through the Internet or the like, and an operation section 32 for a user to enter information which the user intends to designate or set, such as a remote controller, for example. This remote controller, not shown, is arbitrarily provided with various kinds of operation buttons and/or a joystick for displaying various types of menus on a screen of a display section as described below, for selection of a menu or an item from among various types of menus and/or items on the screen, and for executing the selected menu or the like. The terminal or navigation apparatus further includes a GPS receiver 33 for detecting the latitude and longitude of the present vehicle position based on a GPS signal sent from a GPS satellite, and a self-contained navigation sensor 34, which includes an angle sensor (gyro or the like) for detection of a traveling direction of the vehicle, and a distance sensor for generating a pulse at predetermined intervals of travel.

The terminal further includes a data storage section 35 for storing therein map data, route data (node series), or the like associated with navigation and received from the information center 20, a connection ID storage section 36 for storing therein ID information for specifying the vehicle (i.e., a user of the vehicle-mounted terminal 30), a display section 37 composed of a LCD monitor or the like for providing a user with guidance information associated with the navigation (a map covering the surrounding area of the vehicle position, a mark indicative of the vehicle position, a guidance route from the vehicle position to the destination, or the like) through the screen, and a voice guidance section 38, such as a speaker, for providing the user with the guidance information associated with the navigation by voice.

A controller 39 is composed of a microcomputer or the like, and is operably connected to each of functional blocks 31 to 38. The controller 39 executes various procedures associated with the navigation. More specifically, the controller detects the present vehicle position based on a signal output from the GPS receiver 33, determines a direction of the vehicle and a traveling speed thereof based on signals output from the self-contained navigation sensor 34, and transmits positional data concerning the vehicle position and the destination by using the portable telephone 31. The controller further stores in the data storage section 35 the map data associated with the result of route searching sent from the information center 20 in response to the positional data, which has been transmitted to the center. Also, the controller displays a guidance route superimposed on a map image on the screen of the display section 37 based on the map data, and further displays various types of menu screens (operation screens), the vehicle position mark, or the like, depending on an operational condition of the apparatus. Thus, the route guidance to the destination is achieved. In addition, the controller 39 controls setting and release of "a communication connection stand-by state" for the portable telephone 31, which will be described below in more detail as procedures associated with the invention.

In the navigation system 10 (information center 20 and navigation apparatus 30) of the present embodiment with the aforesaid configuration, the portable telephone 31 corresponds to a "communication means", the GPS receiver 33 to a "vehicle position detecting means", the data storage section 35 to a "memory means", the display section 37 to a "displaying means", the voice guidance section 38 to a "voice guidance means", and the controller 39 to a "controlling means", respectively.

Figure 3:
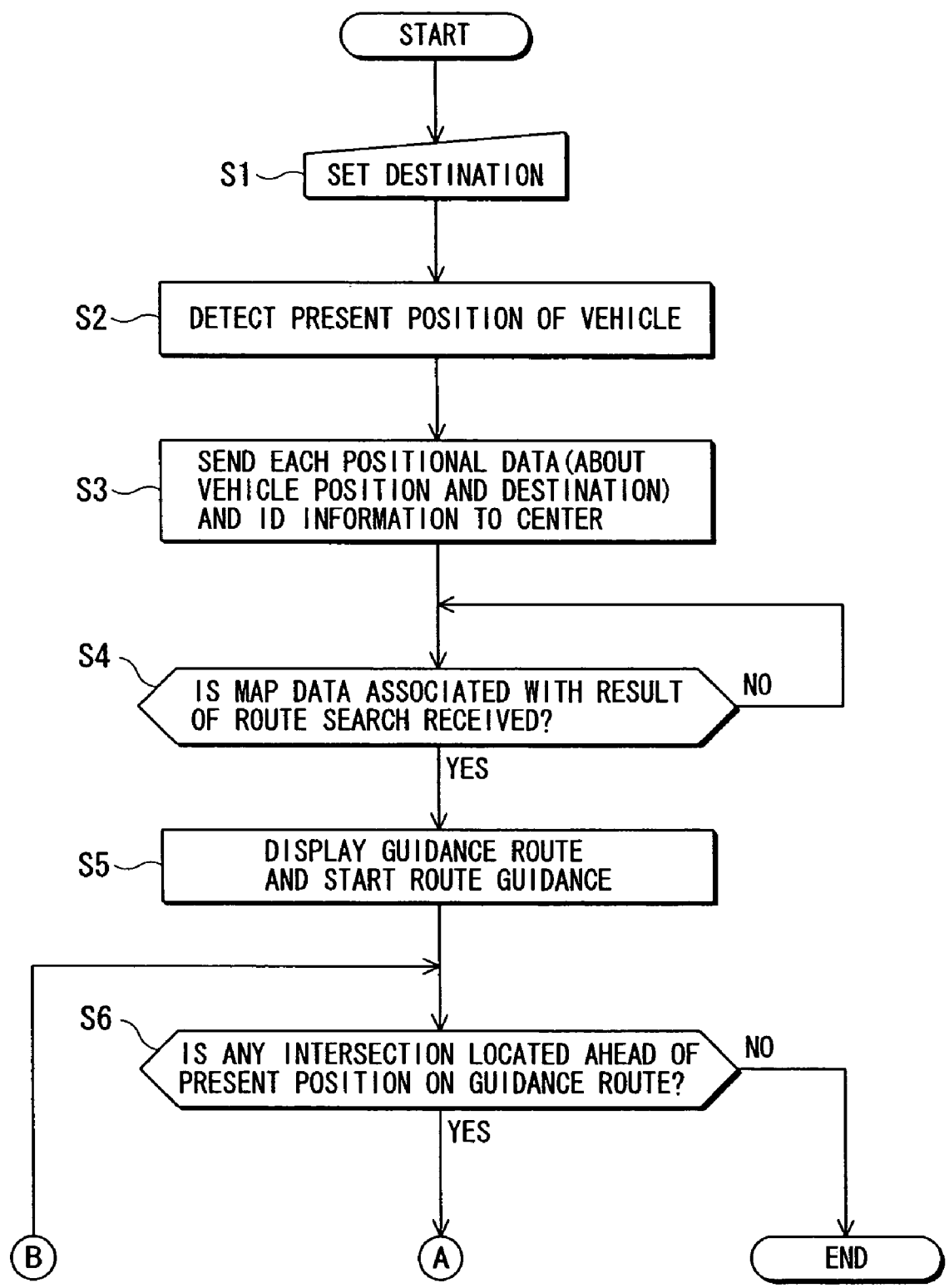
FIG. 3 is a flowchart showing one example of a procedure for acquisition of navigation information and for route guidance based on the information, which can be performed by the vehicle-mounted terminal (navigation apparatus) in the system of FIG. 1.
Figure 4:
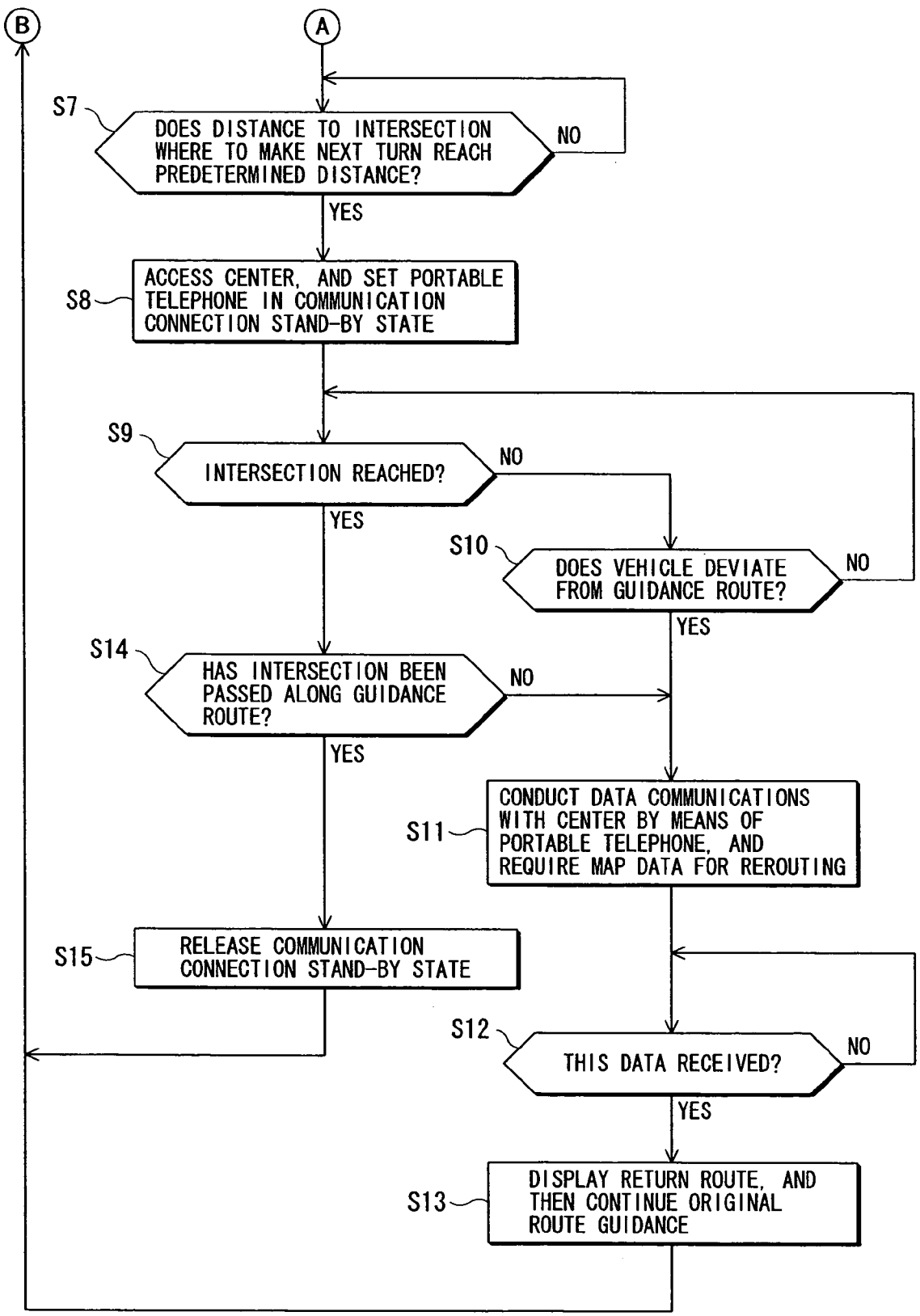
FIG. 4 is a flowchart continuing to show the example in FIG. 3 of a procedure for acquisition of navigation information and for route guidance based on the information, which can be performed by the vehicle-mounted terminal (navigation apparatus) in the system of FIG. 1.

Now, procedures for acquisition of the navigation information and for route guidance based on the information, which are performed on the vehicle-mounted terminal (navigation apparatus) 30 side in the navigation system 10 of the embodiment will be explained hereinafter with reference to FIGS. 3 and 4 illustrating an example of processing flowcharts.

First, referring to FIG. 3, a user manipulates a remote controller (operation section 32) to set a destination at a first step S1. At this time, if necessary, a transit point on the way to the destination may be set, or various conditions (e.g., whether high priority is given to a toll road or a general road, or whether high priority is given to reduction in a travel distance or time) may also be set. The set data including the destination and the like is entered to the controller 39.

At a next step S2, the controller 39 detects the present position of the vehicle based on the positional information (latitude and longitude) detected by the GPS receiver 33.

At a next step S3, positional data for designating each of the present vehicle position (vehicle position) and the destination, and the ID information read from the connection ID storage section 36 are sent to the information center 20 by using the portable telephone 31 under control of the controller 39.

In the information center 20, not shown in the flowchart, an appropriate guidance route (recommended route) connecting the present vehicle position and the destination is searched for or retrieved by the system controller 24, based on the ID information of the vehicle and the positional data (vehicle position, destination) received from the vehicle-mounted terminal 30 through the communication controller 21, with reference to the latest map data (road information, POI information, or the like) stored in the map database 22. The map data associated with the result of the route search (data for displaying the guidance route, data for displaying the map of the surrounding area of the vehicle position, and the like) is delivered to the vehicle-mounted terminal 30 through the communication controller 21. At this time, a piece of data concerning the route among the map data delivered to the terminal 30 is stored in the user database 23, in relation to the ID information of the vehicle.

At a next step S4, the controller 39 determines whether the map data associated with the result of the route search and delivered from the information center 20 is received (YES) or not (NO) through the portable telephone 31. If yes, an operation proceeds to a next step S5. If no, this determination is repeatedly performed until the map data has been received. After the map data associated with the result of the route search (data about the guidance route, data about the map of the surrounding area, or the like) from the information center 20 is received, the map data is temporarily stored in the data storage section 35.

At the next step S5, the guidance route stored in the data storage section 35 is displayed on the screen of the display section 37 under control of the controller 39, and then route guidance is started.

At a next step S6, the controller 39 determines whether any intersection is located ahead of the present vehicle position on the guidance route being shown (YES) or not (NO), based on the present vehicle position detected from the output signal from the GPS receiver 33 and the map data stored in the data storage section 35. If yes, an operation proceeds to a next step S7. If no, the present processing flowchart is terminated.

At the next step S7 (see FIG. 4), the controller 39 determines whether the vehicle has reached a point located a predetermined distance (e.g., 700 m) before an intersection where the vehicle is to turn next (YES) or not (NO), based on the map data stored in the data storage section 35 and the present vehicle position detected using the output signal from the GPS receiver 33. If yes, an operation proceeds to step S8. If no, this determination is repeatedly performed until the vehicle reaches the point located at the predetermined distance.

At the next step S8, the information center 20 is accessed by the portable telephone 31 under the control of the controller 39, and a preparation state in which data communications can be conducted with the information center 20 at any time is established (communications established). That is, at this time, the portable telephone 31 remains in the "communication connection stand-by state", and hence the actual data communication is not conducted. For example, since charging is based on the pay-as-you-go system for packet telecommunication, without the data communications, it would not cost the user at all (i.e., no communication costs).

At a next step S9, the controller 39 determines whether the vehicle has reached the intersection (YES) or not (NO), based on the map data stored in the data storage section 35 and the present vehicle position detected using the output signal from the GPS receiver 33. If the vehicle has not reached the intersection yet (if not), operation proceeds to step S10. If the vehicle reaches the intersection without deviating from the guidance route (if yes), operation proceeds to step S14.

At step S10 (i.e., when the vehicle has not reached the intersection yet), the controller 39 determines whether or not the vehicle goes off-route, that is, whether the vehicle deviates from the guidance route (YES) or not (NO), based on the map data stored in the data storage section 35 and the present vehicle position detected using the output signal from the GPS receiver 33. If yes, operation proceeds to step S11. If no, operation returns to step S9, so that the above-mentioned procedure is repeatedly carried out.

At the next step S11 (when the vehicle goes off-route), an actual data communication is conducted with the information center 20 by the portable telephone 31 under control of the controller 39 at that time to request navigation information needed for the vehicle to return to the original guidance route (map data for rerouting) from the center. When requiring this map data for rerouting, a command to request another search for rerouting is sent from the vehicle-mounted terminal 30 to the information center 20, as well as the positional data indicative of the present vehicle position and the ID information.

The information center 20 searches for an appropriate route from the present vehicle position back to the original guidance route in the system controller 24, for example, the shortest route (return route) from the last intersection in the direction of travel to the guidance route, based on the ID information of the vehicle and the vehicle position data sent from the vehicle-mounted terminal 30 with reference to the latest map data stored in the map database 22, and the data about the original guidance route corresponding to the ID information stored in the user database 23. The map data for rerouting associated with the search result (data for display of the return route, data for display of the map covering the surrounding area of the vehicle, and the like) is delivered to the vehicle-mounted terminal 30 through the communication controller 21. At this time, a piece of data concerning the route among the map data delivered to the vehicle-mounted terminal 30 is stored in the user database 23 in relation to the ID information of the vehicle.

At a next step S12, the controller 39 determines whether the map data for rerouting delivered from the information center 20 is received by the portable telephone 31 (YES) or not (NO). If yes, operation proceeds to step S13, if no, the determination is repeatedly performed until the map data is received. After the map data for rerouting has been received from the information center 20, the map data is temporarily stored in the data storage section 35. At the receipt time of the map data for rerouting, the controller 39 releases a "communication connection stand-by state" of the portable telephone 31.

At the next step S13, the return route stored in the data storage section 35 is displayed together with the original guidance route on the screen of the display section 37 under the control of the controller 39, so that guidance of the vehicle along the guidance route is continued. Thereafter, operation returns to step S6 (see FIG. 3) to repeat the above-mentioned procedure.

In contrast, at step S14 (when the vehicle reaches the intersection), the controller 39 determines whether the vehicle has passed through the intersection along the guidance route (YES) or not (NO), based on the map data stored in the data storage section 35 and the present vehicle position detected using the output signal from the GPS receiver 33. If the vehicle does not go off-route and passes through the intersection (if yes), operation proceeds to step S15. If the vehicle goes off-route after passing through the intersection (if NO), operation returns to step S1 to repeat the above-mentioned procedure.

At the next step S15 (when the vehicle passes through the intersection along the guidance route without going off-route), the controller 39 releases the "communication connection stand-by state" of the portable telephone 31. Thereafter, operation returns to step S6 (see FIG. 3) to repeat the above-mentioned procedure.

FIGS. 5 to 9 show examples of display screens to supplement the above-mentioned flowcharts (FIGS. 3 and 4).

Figure 5:
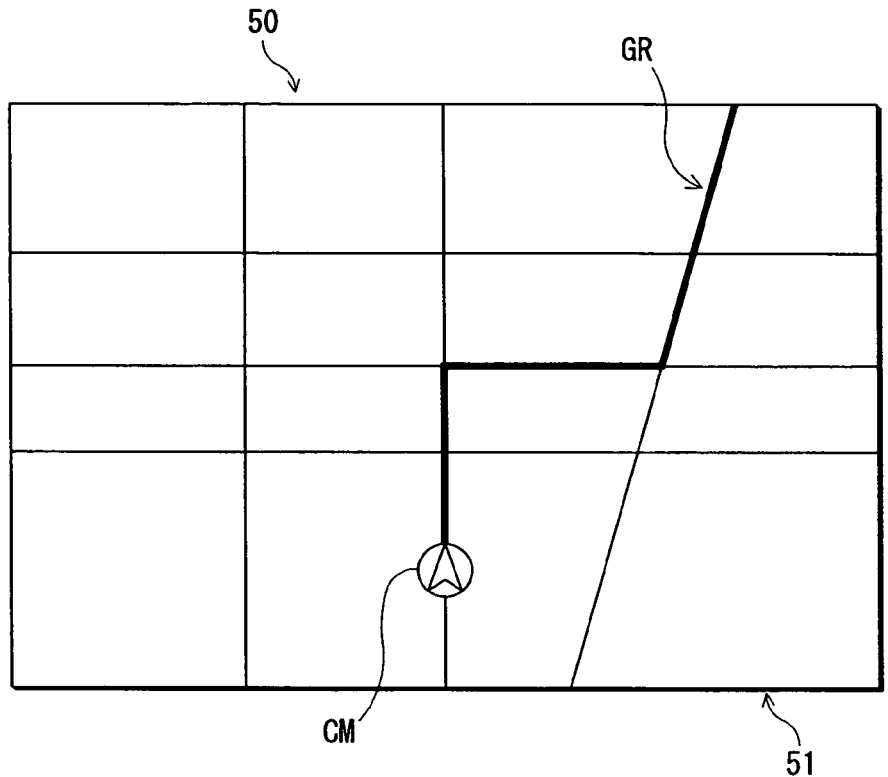
FIG. 5 shows an example of a display screen during the route guidance.

FIG. 5 shows an example of the display screen when carrying out the route guidance. This screen corresponds to a procedure carried out at step S5 in the above-mentioned flowchart (FIG. 3). In the example shown, a guidance route GR from the vehicle position (CM) to the destination is displayed on a map image 51 displayed on the display screen 50, together with the vehicle position mark CM indicative of the present position of the vehicle. At this time, the guidance route GR may desirably be displayed in a display form different from that of other roads (e.g., in a thick line, in a distinguishable color, or the like) so that the user can identify the guidance route easily. This enables the user to understand the guidance route GR which guides the vehicle to the destination through the display screen 50.

Figure 6:
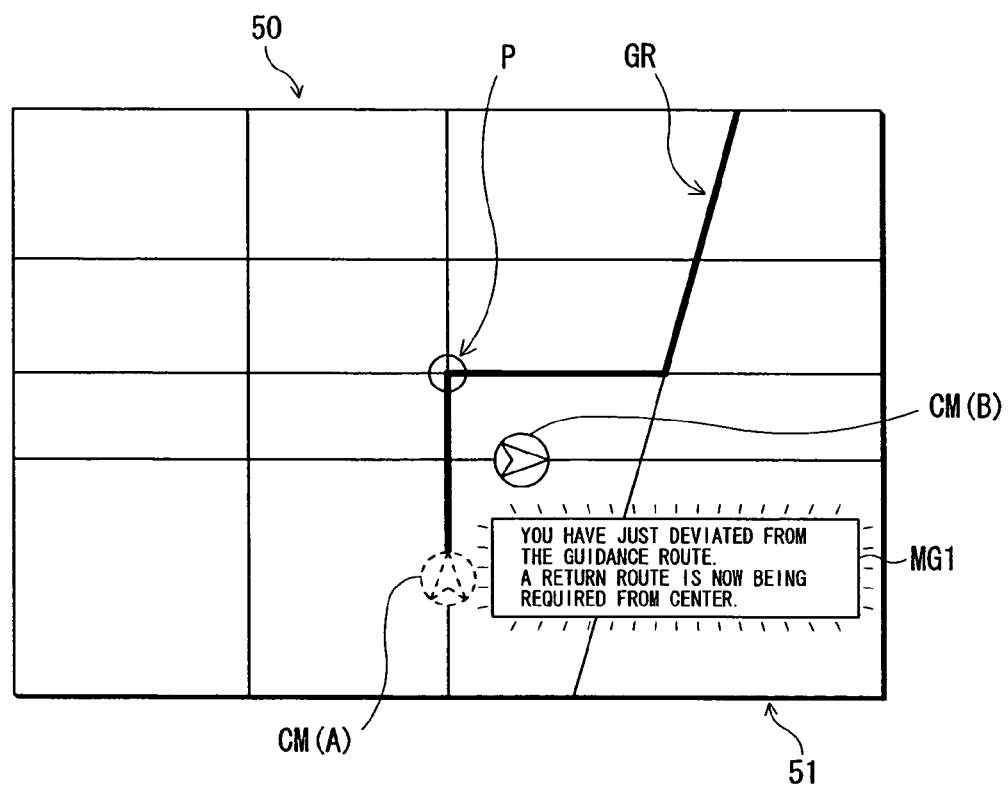
FIG. 6 shows an example of a display screen when the vehicle goes off-route.

FIG. 6 shows an example of the display screen when the vehicle goes off-route. This screen corresponds to a procedure carried out at step S11 when the result of determination at step S10 is yes (i.e., when the vehicle goes off-route before reaching the intersection) in the above flowchart (FIG. 4). The display example shown represents the display screen in a case where the vehicle does not go straight along a road which is to be traveled straight as viewed from the present position (CM (A) expressed in a broken line), due to a driver's misunderstanding or the like on the guidance route GR displayed on the map image 51 of the display screen 50, and turns right (CM (B)) at an intersection before an intersection P to deviate from the original guidance route GR. Furthermore, on the display screen 50, a message MG1 ("You have just deviated from the guidance route. A return route is now being requested from the center.") is also displayed. At this time, this message MG1 is desirably displayed in a relatively distinguishable display form (in a blinking form in the example shown) so that the user can identify it easily. This allows the user to understand that although the vehicle has deviated from the original guidance route GR, the return route to lead the vehicle back to the guidance route is being requested from the information center 20. Note that, instead of the display of the message MG1 on the screen 50, voice guidance may be carried out by the speaker 38 or the like. Alternatively, in addition to the voice guidance of the message MG1, guidance on the screen 50 may be provided.

Figure 7:
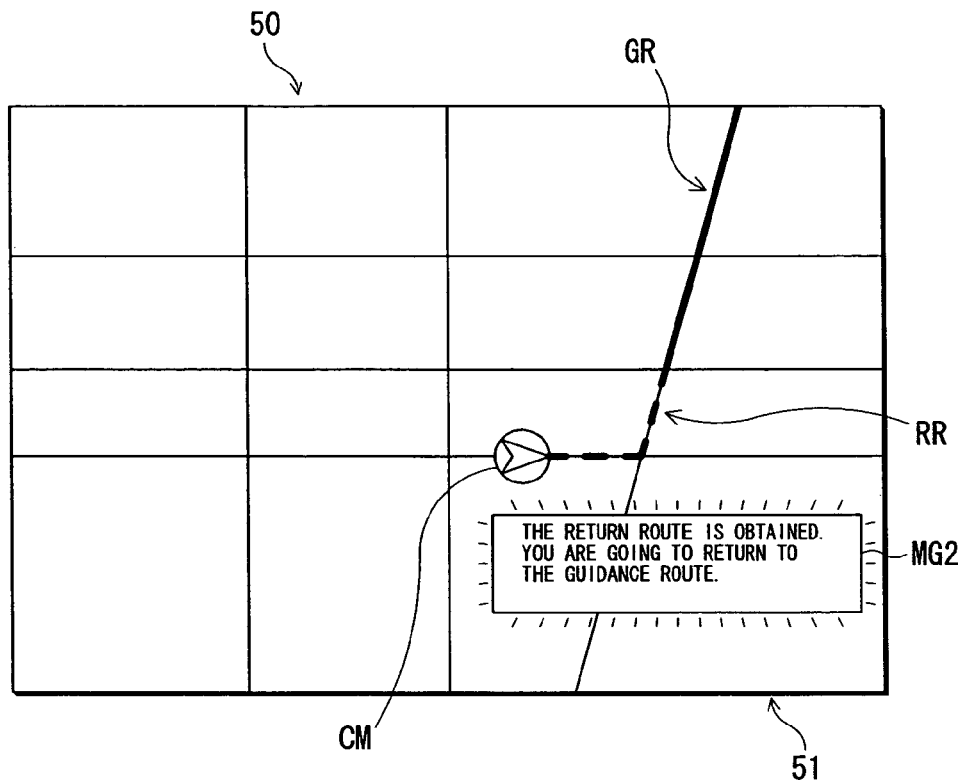
FIG. 7 shows an example of a display screen when the vehicle is going to return to an original guidance route after going off-route.

FIG. 7 shows an example of the display screen when the vehicle is going to return to the original guidance route after going off-route. This screen corresponds to a procedure carried out at step S13 when the result of the determination at step S10 is yes in the above flowchart (FIG. 4). The example shown represents a case in which a route (return route RR) for the vehicle to travel on so as to return to the original guidance route GR from the present position of the vehicle (CM) is displayed together with the guidance route GR on the map image 51 displayed on the display screen 50. The return route RR is expressed in a thick broken line in the example shown, but is not limited to this display. For example, the return route RR may be displayed in a blinking form, or otherwise in a different color from the guidance route GR. Furthermore, on the display screen 50, a message MG2 ("The return route is obtained. You are going to return to the guidance route.") is also displayed. This message MG2 is desirably displayed in a relatively distinguishable display form (in a blinking form in the example shown) so that the user can identify it easily, as is the case with the example of the display screen of FIG. 6. This allows the user to understand that the vehicle is going to return to the original guidance route GR. Note that, instead of the display of the message MG2 on the screen 50, voice guidance may be carried out by the speaker like. Alternatively, guidance on the screen 50 may be provided together with the voice guidance of the message MG2.

Figure 8:
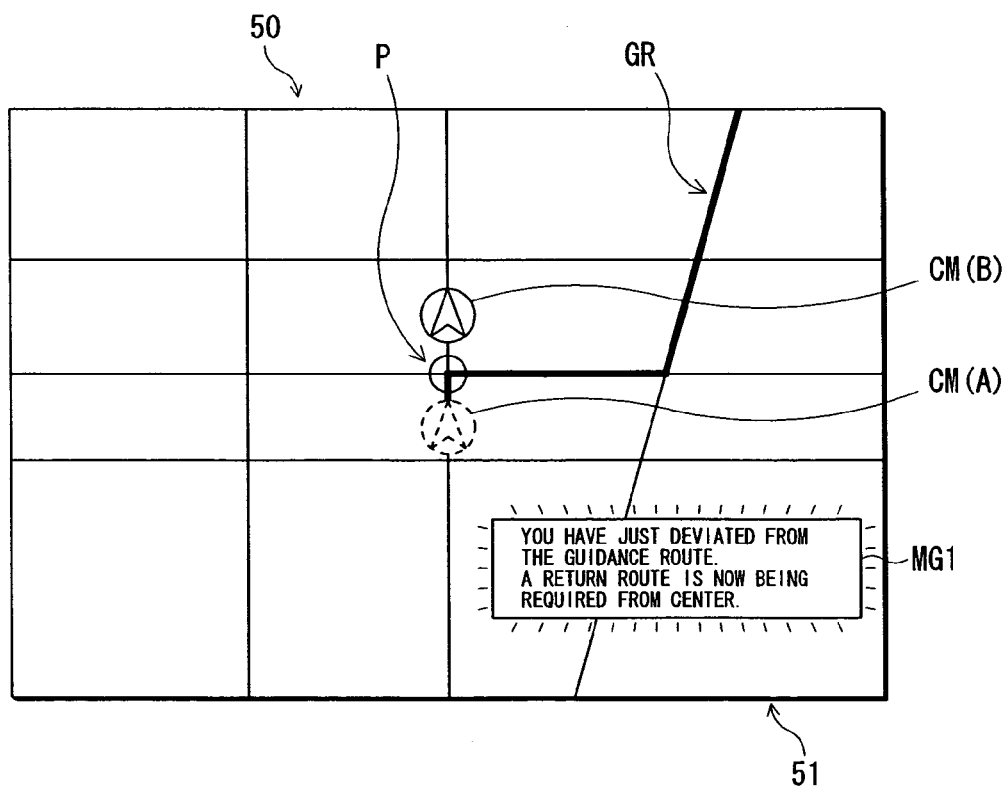
FIG. 8 shows another example of a display screen when the vehicle goes off-route.

FIG. 8 shows another example of the display screen when the vehicle goes off-route. This screen corresponds to a procedure carried out at step S11 when the result of the determination at step S14 is no (i.e., when the vehicle goes off-route after passing through the intersection) in the above flowchart (FIG. 4). The display example shown represents the display screen in a case where the vehicle does not turn right at an intersection P where the vehicle is to turn right as viewed from the present position (CM(A) expressed in a broken line) on the guidance route GR displayed on the map image 51 of the display screen 50, due to a driver's misunderstanding or the like, and goes straight (CM(B)) to deviate from the original guidance route GR. Furthermore, a message MG1 ("You have just deviated from the guidance route. A return route is now being requested from the center.") is also displayed as is the case with the example of the display screen of FIG. 6. The display form of this message MG1 is the same as that in the above-mentioned case. Substitution of voice guidance by use of the speaker 38 for the foregoing display of the message, or otherwise combining the voice guidance and the display guidance on the screen 50, may be carried out in the same way as in the above-mentioned case.

Figure 9:
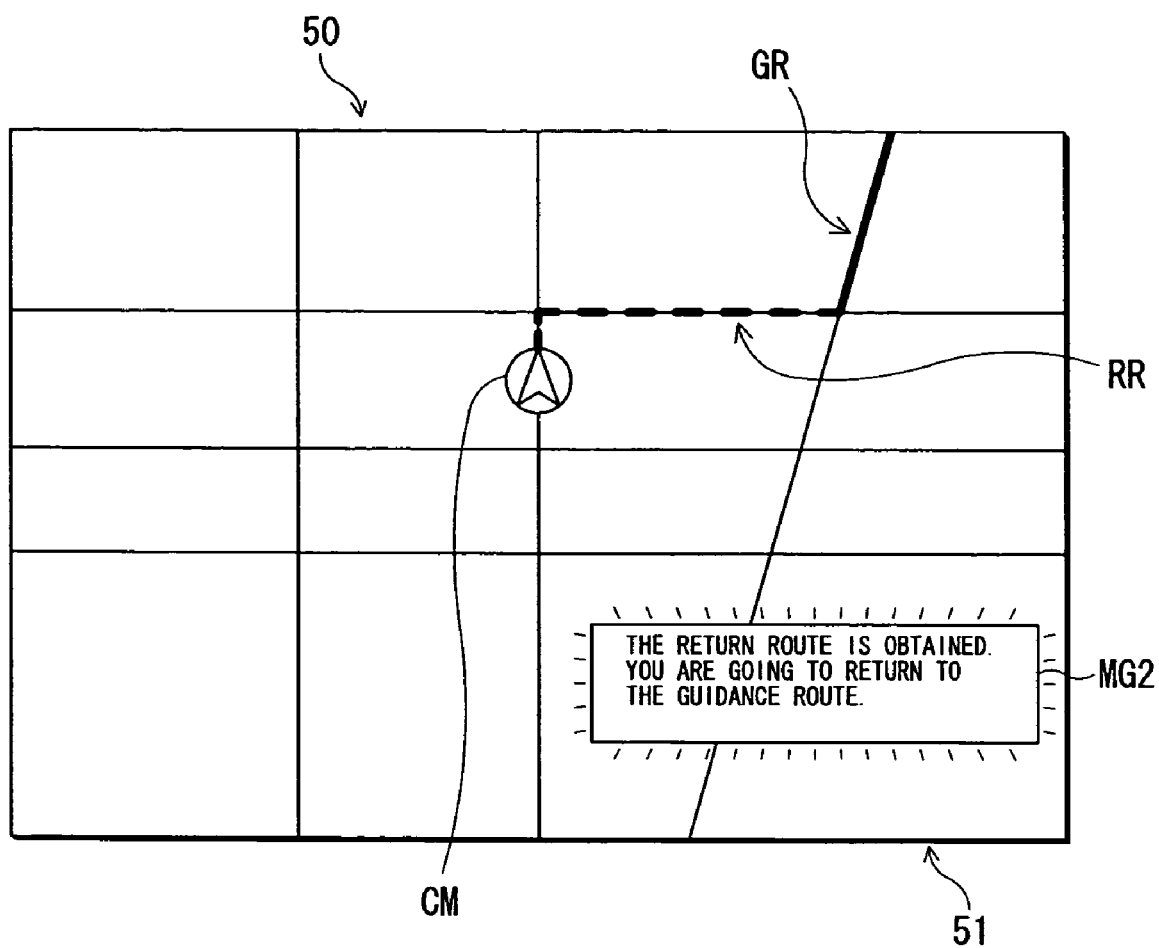
FIG. 9 shows another example of a display screen when the vehicle is going to return to an original guidance route after going off-route.

FIG. 9 shows another example of the display screen when the vehicle is going to return to the original guidance route after going off-route. This screen corresponds to a procedure carried out at step S13 when the result of the determination at step S14 is no in the above flowchart (FIG. 4). The example shown represents a case in which a route (return route RR) for the vehicle to travel on so as to return to the original guidance route GR from the present vehicle position (CM) is displayed together with the guidance route GR on the map image 51 displayed on the display screen 50, as is the case with the example of the display screen of FIG. 7. Furthermore, a message MG2 ("The return route is obtained. You are going to return to the guidance route.") is also displayed. The display form of this message MG2 is the same as that in the above-mentioned case. Substitution of voice guidance by use of the speaker 38 for the foregoing display of the message, or otherwise combining the voice guidance and the display guidance on the screen 50, may be carried out in the same way as the above-mentioned case.

Note that the procedures associated with the intersection guidance are not particularly illustrated in the above-mentioned flowcharts (FIGS. 3 and 4), because such intersection guidance is normally carried out in the typical vehicle navigation apparatus. For example, when the vehicle reaches a point located at a distance of 300 m before the intersection, the intersection guidance is performed. Therefore, the intersection guidance is carried out at any point in a loop of the above-mentioned flowchart, which loop is composed of step S8, step S9 (when the result of determination is NO), step S10 (when the result of determination is NO), and step S9 in this order. The intersection guidance is performed as follows. For example, when the vehicle reaches the point located at the distance of 300 m before the intersection, the display screen of the display section 37 is divided into right and left screens under the control of the controller 39. On one of the screens, the same contents have been displayed and maintained since before the division, while, on the other screen, an enlarged view of the intersection is displayed. At this time, the voice guidance "Please turn right at the intersection located ahead of you" is given by the speaker 38 or the like under the control of the controller 39. Such guidance display of the intersection is normally released when the vehicle passes through the intersection. Accordingly, in the above-mentioned processing flowchart, the display of the intersection guidance is released at step S14. At this time, the display screen of the display section 37 is switched from the intersection guidance screen to the original guidance screen (see FIG. 5).

As explained above, according to the navigation system 10 (the information center 20 and the navigation apparatus 30) of the present embodiment, when the vehicle reaches the point located at a predetermined distance (700 m in the present embodiment) before the intersection, which might cause off-route, preparation for communication connection is started by setting the portable telephone 31 in the communication connection stand-by state. Thus, if the vehicle goes off-route in the vicinity of the intersection, the possibility that the communication connection stand-by state has already been established at the off-route time is very high. In other words, a time required for communication connection is substantially eliminated, as compared to the conventional case in which preparation for the communication connection is started at the off-route time, so that the necessary navigation information (map data for rerouting) can be obtained quickly at the off-route time.

Further, in order to obtain the necessary map data for rerouting in the case of going off-route, the total time of at least the communication connection time and the data obtaining time is needed in the prior art, while the communication connection time substantially is not required in the present embodiment. This enables reduction in the total time spent on communication, thus resulting in reduction in communication costs. For example, when using the pay-as-you-go communication service, such as a packet telecommunication, without carrying out the data communications, it would not cost a user of the system at all (i.e., no communication costs).

can be seen from the above description, in the navigation system 10 of the present embodiment, when the vehicle goes off-route while the route guidance is being provided by communication navigation, the communication connection time substantially is not required, whereby the map data for rerouting (navigation information) can be obtained quickly from the information center 20. In order to achieve such a condition in which the communication connection time substantially is not required, when the vehicle reaches a spot located at a distance of 700 m before an intersection, which might cause the driver to mistake the road during driving on the guidance route, the portable telephone 31 is set in the communication connection stand-by state. This enables quick data communications when the data communication with the information center 20 is necessary (that is, when the vehicle goes off-route in the vicinity of the intersection). In this case, while the vehicle is traveling from the point located at the distance of 700 m before the intersection until it goes off-route, the preparation state (communication connection stand-by state) in which the data communication with the information center 20 can be carried out at any time, is established. It should be noted that the communication connection stand-by state might not be established necessarily when the vehicle is off-route, depending on a traffic condition (congestion condition) until the vehicle reaches the intersection, a communication condition with the information center 20, or the like. In this case, some communication connection time may be needed. But this communication connection time is obviously much less, as compared with the conventional case of starting the communication connection preparation at the off-route time.

Considering such a condition, although it is desirable that the portable telephone 31 constantly remains in the communication connection stand-by state, this state inconveniently renders the portable telephone 31 unusable for normal voice call, e-mails, or the like.

Therefore, according to the present embodiment, when the portable telephone 31 is used as the communication means with the information center 20, it is not kept constantly in the communication connection stand-by state. Once the vehicle reaches a point located at a predetermined distance before an intersection, which might be a main cause of going off-route, the portable telephone 31 is set in the communication connection stand-by state. Thereafter, this communication connection stand-by state is released when the vehicle passes through the intersection along the guidance route without going off-route. Alternatively, in a case where the vehicle goes off-route in the vicinity of the intersection, the communication connection stand-by state is released when the map data for rerouting is obtained from the information center 20. This eliminates the inconvenience of not being able to use the portable telephone for normal voice calls, or the like, and achieves a reduction in communication time and costs.

It should be noted that although the portable telephone 31 is used as a communication means with the information center 20 in the above-mentioned embodiments, communication means other than the portable telephone 31 may be used. For example, a mobile telephone may be used, or alternatively a communication apparatus for transmission and reception of navigation information (for example, "Air Navi" produced by Pioneer Corporation) may be used. In the case of employing the latter, the communication apparatus is not intended to be used for a voice call, and can be constantly maintained in the communication connection stand-by state.

In the above-mentioned embodiments, when the vehicle goes off-route (when the result of the determination at step S10 is yes, or when the result of the determination at step S14 is no), the map data for rerouting is requested from the information center 20 (step S11). But measures taken in the off-route situation are not limited thereto. For example, when the vehicle goes off-route, a new destination may be set again, and a route search for a route to the new destination may be requested from the information center 20. In this case, data on the newly set destination is transmitted together with the vehicle ID information and the data about the vehicle position from the vehicle-mounted terminal 30 to the information center 20 in the same manner as step S3.

Note that although, in the above-mentioned embodiments, a completely off-board type of communication navigation (vehicle-mounted terminal 30) is taken as an example, in which all information required for the route guidance of the vehicle is obtained by communication from the information center 20, the type of communication navigation is not limited thereto. As can be seen from the spirit of the invention, the communication navigation apparatus has only to have a sufficient function to search for the guidance route from the present vehicle position to the destination based on a requirement from the vehicle-mounted terminal 30 on the information center 20 side, and to execute route guidance based on the result of the route search. For example, the terminal may have a partial combination of the communication navigation function and the local navigation function. In this case, the vehicle-mounted terminal 30 is provided with an installed map database (e.g., a rewritable storage medium, such as a DVD-ROM, or a HDD) which stores therein the minimum map data required for the route guidance of the vehicle.

It should be noted that although the intersection is taken as an example of the fork at which a turn is to be made in the description of the above-mentioned embodiments, the type of the fork is not limited thereto. As can be understood by the spirit of the invention, when the guidance route provided by the information center 20 includes a point where the vehicle should change its direction of travel, regardless of whether the point is an intersection or a fork such as the junction of three or five streets, the invention can be applied in the same way.

The embodiments described above are merely examples of the present invention. The technical scope of the present invention should not be understood to be limited by the embodiments described above. Various changes and modifications can be made to the present invention without departing from the spirit and scope thereof.

What is claimed is:

1. A navigation system comprising:
   a vehicle-mounted terminal; and
   a server connected in communication with the terminal for executing route guidance to provide a guidance route from a present position of a vehicle to a destination based on a requirement from the terminal,
   wherein, when the vehicle-mounted terminal determines that the vehicle reaches a point located at a predetermined distance before a fork representing a next change in direction of travel on the guidance route provided by the server, said vehicle-mounted terminal accesses the server through a communication section to set the communication section in a communication connection stand-by state, and if the vehicle-mounted terminal determines that the vehicle deviates from the guidance route, said vehicle-mounted terminal requests navigation information needed for the vehicle to return to the guidance route, from the server through the communication section.

2. The navigation system according to claim 1, wherein said vehicle-mounted terminal comprises a vehicle position detecting section for determining the present position of the vehicle and an ID information storage section for storing therein ID information for specifying a user of the terminal, and
   wherein, when the navigation information needed for the vehicle to return to the guidance route is requested from the server through the communication section, the terminal sends information about the present position of the vehicle and the ID information stored in the ID information storage section to the server.

3. The navigation system according to claim 1, wherein, when the vehicle deviates from the guidance route, the vehicle-mounted terminal informs the user that the navigation information needed for the vehicle to return to the guidance route is requested from the server by one of displaying a message or by voice.

4. The navigation system according to claim 1, wherein said vehicle-mounted terminal releases the communication connection stand-by state of the communication section when the vehicle passes through the fork along the guidance route, as determined by the vehicle-mounted terminal.

5. The navigation system according to claim 1, wherein said vehicle-mounted terminal releases the communication connection stand-by state of the communication section when the terminal receives the necessary navigation information requested from the server.

6. The navigation system according to claim 1, wherein said communication section is a portable telephone.

7. A vehicle navigation apparatus comprising:
   a communication section for communicating with a server that delivers various kinds of information associated with navigation;
   a vehicle position detecting section for detecting a present position of a vehicle;
   a memory section for storing therein map data about the navigation obtained from the server through the communication section;
   a controller operably connected to the communication section, the vehicle position detecting section, and the memory section; and
   at least one of a display section for providing guidance information by screen and a voice guidance section for providing guidance information by voice;
   wherein, when the controller detects the vehicle reaching a point located at a predetermined distance before a fork representing a next change in direction of travel with reference to the present vehicle position and the map data while the vehicle is being guided along a guidance route provided by the server, said controller sets the communication section in a communication connection stand-by state, and if the controller detects the vehicle deviating from the guidance route, said controller requests navigation information needed for the vehicle to return to the guidance route, from the server through the communication section.

8. The vehicle navigation apparatus according to claim 7, wherein said controller releases the communication connection stand-by state of the communication section when the controller detects the vehicle passing through the fork along the guidance route.

9. The vehicle navigation apparatus according to claim 7, wherein said controller releases the communication connection stand-by state of the communication section when the controller receives the necessary navigation information requested from the server through the communication section.

10. The vehicle navigation apparatus according to claim 7, wherein said communication section is a portable telephone.

11. The vehicle navigation apparatus according to claim 7, wherein, when the controller detects the vehicle deviating from the guidance route after setting the communication section in the communication connection stand-by state, said controller requests navigation information needed for guiding the vehicle to another destination, from the server through the communication section, instead of navigation information needed for the vehicle to return to the guidance route.

12. The vehicle navigation apparatus according to claim 7, wherein, when the controller requests the navigation information needed for the vehicle to return to the guidance route from the server through the communication section, said controller displays on a screen of the display section a message that the vehicle has deviated from the guidance route, and that the navigation information needed for the vehicle to return to the guidance route is being requested.

13. The vehicle navigation apparatus according to claim 12, wherein said controller provides the message through the voice guidance section, instead of displaying the message on the screen of the display section.

14. The vehicle navigation apparatus according to claim 12, wherein, when the message is displayed on the screen of the display section, said controller also provides the message through the voice guidance section.

15. The vehicle navigation apparatus according to claim 12, wherein, when the controller receives the necessary navigation information requested from the server through the communication section, said controller displays a route which leads back to the original guidance route, and which is included in the received information, on the screen of the display section in a distinctive display form.

16. The vehicle navigation apparatus according to claim 15, wherein said controller further displays on the screen of the display section a message that the navigation information needed for the vehicle to return to the original guidance route has been obtained, and that the vehicle is going to return to the guidance route.

17. A method for obtaining navigation information in a vehicle navigation apparatus connected in communication with a server for executing route guidance to provide a guidance route from a present position of a vehicle to a destination based on a requirement from the vehicle, the method comprising:
when the vehicle reaches a point located at a predetermined distance before a fork representing a next change in direction of travel on the guidance route while the vehicle is guided along the guidance route provided by the server, accessing said server through a communication section to set the communication section in a communication connection stand-by state; and
if the vehicle deviates from the guidance route, requesting navigation information needed for the vehicle to return to the guidance route from the server through the communication section.

18. The method according to claim 17, further comprising releasing the communication connection stand-by state of the communication section when the vehicle passes through the fork without deviating from the guidance route after setting the communication section in the communication connection stand-by state.

19. The method according to claim 17, further comprising releasing the communication connection stand-by state of the communication section when the necessary navigation information requested from the server is received through the communication section after setting the communication section in the communication connection stand-by state.

20. The method according to claim 17, wherein a portable telephone is used as the communication section.

* * * * *